(12) United States Patent
Cordero et al.

(10) Patent No.: US 9,037,948 B2
(45) Date of Patent: May 19, 2015

(54) ERROR CORRECTION FOR MEMORY SYSTEMS

(71) Applicant: International Business Machines Corporation, Armonk, NY (US)

(72) Inventors: Edgar R. Cordero, Round Rock, TX (US); Marc A. Gollub, Round Rock, TX (US); Girisankar Paulraj, Bangalore (IN); Diyanesh B. Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/799,986

(22) Filed: Mar. 13, 2013

(65) Prior Publication Data

US 2014/0281681 A1   Sep. 18, 2014

(51) Int. Cl.
*G11C 29/00* (2006.01)
*G06F 11/14* (2006.01)

(52) U.S. Cl.
CPC .................................. *G06F 11/1469* (2013.01)

(58) Field of Classification Search
CPC ............ G06F 11/1076; G06F 11/1008; G06F 11/106; H05K 999/99; G11C 2029/0411
USPC .......................................................... 714/764
See application file for complete search history.

(56) References Cited

U.S. PATENT DOCUMENTS

| 8,626,998 | B1 * | 1/2014 | Amidi et al. .................. 711/105 |
| 2006/0059393 | A1 | 3/2006 | Oppold et al. |
| 2008/0294950 | A1 | 11/2008 | Alves et al. |
| 2011/0047440 | A1 * | 2/2011 | Blackmon et al. ............. 714/764 |
| 2011/0082971 | A1 | 4/2011 | Berke |
| 2012/0173936 | A1 * | 7/2012 | Johnson et al. ................ 714/718 |
| 2012/0191921 | A1 | 7/2012 | Shaeffer et al. |
| 2013/0191698 | A1 * | 7/2013 | Meaney et al. ................ 714/758 |

FOREIGN PATENT DOCUMENTS

| WO | WO0217081 A1 | 2/2002 |
| WO | WO2008127698 A2 | 10/2008 |

OTHER PUBLICATIONS

K. Lund, "133 MHz PCI-X to 128 MB DDR Small-Outline DIMM Memory Bridge," Feb. 14, 2006; pp. 1-13.

* cited by examiner

*Primary Examiner* — M. Mujtaba K Chaudry
*Assistant Examiner* — Enam Ahmed
(74) *Attorney, Agent, or Firm* — Cantor Colburn LLP

(57) ABSTRACT

According to one embodiment, a method for error correction in a memory module having ranks is provided where each rank has memory devices. The method includes determining a first mark condition for a first rank of the memory module, the first mark condition based on one or more uncorrectable error occurring in a first memory device in the first rank, placing a first mark in the first memory device, determining a second mark condition for the first rank, the second mark condition based on one or more uncorrectable error occurring in a second memory device in the first rank, placing a second mark in a third memory device in a second rank of the memory module and configuring the first memory device to respond to commands directed to the second rank, wherein configuring the first memory device is based on placing of the first mark and the second mark.

20 Claims, 5 Drawing Sheets

ERROR CORRECTION FOR MEMORY SYSTEMS

BACKGROUND

The present invention relates generally to computer memory and more particularly to error correction in a memory system.

Computer systems often require a considerable amount of high speed random access memory (RAM) to hold information, such as data and programs, temporarily when a computer is powered and operational. This information is normally binary, composed of patterns of 1's and 0's known as bits of data. The bits of data are often grouped and organized at a higher level. A byte, for example, is typically composed of eight bits; more generally these groups or bytes are called symbols and may be made up of any number of bits or sub-symbols.

Memory device densities have continued to grow as computer systems have become more powerful. In some cases, the RAM content of a single computer can be composed of hundreds of trillions of bits. Unfortunately, the failure of just a portion of a single RAM device can cause system-wide issues. When memory errors occur, which may be "hard" (repeating) or "soft" (one-time or intermittent) failures, these failures may occur as single cell, multi-bit, full chip or full memory module failures and all or part of the system RAM may be unusable until it is repaired. Repair turn-around-times can be hours or even days, which can have a substantial impact to a business dependent on the computer systems. In systems with an array of memory modules (servers, for example), failed memory modules may be isolated temporarily without taking system down, in order to sustain the system operation. However, this would result in memory loss from the overall system memory and would adversely affect the performance.

The probability of encountering a RAM failure during normal operations has continued to increase as the amount of memory storage in contemporary computers continues to grow.

SUMMARY

According to one embodiment, a system for error correction includes a memory module having a plurality of ranks, each rank having a plurality of memory devices, where the system is configured to perform a method including the steps of determining a first mark condition for a first rank of the memory module, the first mark condition based on one or more uncorrectable error occurring in a first memory device at a in the first rank and placing, by a memory controller, a first mark in the first memory device in the first rank. The method also includes determining a second mark condition for the first rank, the second mark condition based on one or more uncorrectable error occurring in a second memory device in the first rank, placing a second mark in a third memory device in a second rank of the memory module, configuring the first memory device to respond to commands directed to the second rank, wherein configuring the first memory device is based on placing of the first mark and the second mark, configuring the third memory device to respond to commands directed to the first rank, wherein configuring the third memory device is based on placing of the first mark and the second mark, reading data from the first rank and writing the data back to the first rank to provide verify data accuracy in the third memory device, where the data in the third memory device was previously in the first memory device, removing, by the memory controller, the first mark in the first rank and placing a third mark in the second memory device in the first rank based on the first mark being removed and the determined second mark condition.

According to another embodiment, a method for error correction in a memory module having a plurality of ranks is provided where each rank has a plurality of memory devices. The method includes determining a first mark condition for a first rank of the memory module, the first mark condition based on one or more uncorrectable error occurring in a first memory device in the first rank, placing a first mark in the first memory device in the first rank, determining a second mark condition for the first rank, the second mark condition based on one or more uncorrectable error occurring in a second memory device in the first rank, placing a second mark in a third memory device in a second rank of the memory module and configuring the first memory device to respond to commands directed to the second rank, wherein configuring the first memory device is based on placing of the first mark and the second mark. The method also includes configuring the third memory device to respond to commands directed to the first rank, wherein configuring the third memory device is based on placing of the first mark and the second mark, reading data from the first rank and writing the data back to the first rank to provide verify data accuracy in the third memory device, where the data in the third memory device was previously in the first memory device, removing the first mark in the first rank and placing a third mark in the second memory device in the first rank based on the first mark being removed and the determined second mark condition.

DETAILED DESCRIPTION

Figure 1:
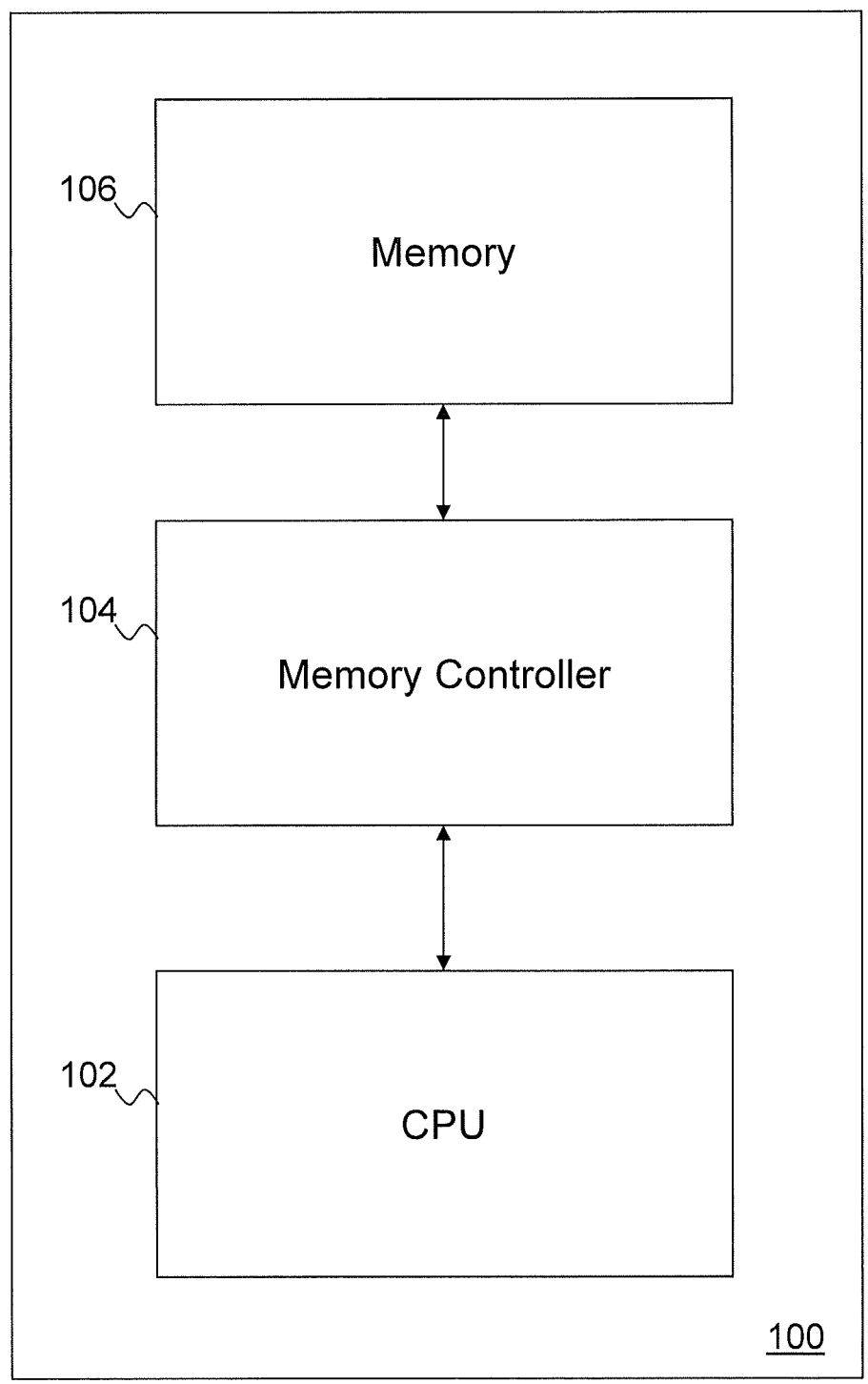
FIG. 1 illustrates a block diagram of a memory system in accordance with an embodiment.

Techniques to detect and correct bit errors are commonly used to restore data to its original/correct form in noisy communication transmission media or for storage media where there is a finite probability of data errors due to the physical characteristics of the device. Memory devices generally store data as voltage levels representing a 1 or a 0 in RAM and are subject to both device failure and state changes due to high energy cosmic rays and alpha particles.

In an embodiment, a group of memory chips or dies in a memory device (e.g., dynamic random-access memory or DRAM), referred to as a rank, are positioned adjacent one another on one or more layer of the memory device. In embodiments, a memory module includes ranks of organized memory devices (e.g., DRAM). The memory devices may each be organized into one or more symbols that correspond to bits that are accessed during each cycle of a transfer to the device. Accordingly, a symbol may have bits that each correspond to a pin location in the device and a cycle or transfer time for that pin during a transfer. In an embodiment, a symbol comprises an arrangement of bits in relation to pins on the memory device.

In embodiments, codes may be used to detect and correct errors in words communicated to or from the memory device. For example, memory error correction codes (also referred to as "error control codes" or "ECCs") use a combination of parity checks in various bit positions of the data word to allow detection and correction of errors. Every time data words are written into memory, these parity checks are generated and stored with the data. Upon retrieval of the data, a decoder can use the parity bits thus generated together with the data message in order to determine whether there was an error and to proceed with error correction if feasible.

In some cases, a single memory error may be identified and corrected by code in the memory system, while multiple errors or failures at a selected point in time may not be identified and corrected, as some error correction systems are unable to detect and correct more than one error at a time. In some cases, an error correction method marks a memory device or chip, such as a RAM, with a mark (referred to as a "chip mark") when the system detects errors in more than one symbol within the memory device. The chip mark may be used on one memory device within a rank, where the error correction method places or enables the chip mark to provide the correct data for the memory device with the chip mark. In addition, a second mark, such as a symbol mark, may also be used in a rank, where the symbol mark is placed or enabled for a symbol within a memory device that has a plurality of errors within the symbol. The exemplary error correction method places the symbol mark to provide the correct data for the symbol. In an embodiment where a rank has placed both the chip mark and the symbol mark, the error correction system may not be able to correct subsequent errors, such as single cell soft errors, experienced by the memory device. Since the next error following the use of the chip mark and symbol mark would result in an uncorrectable error (UE), the use of both chip and symbol mark would require a call out to the user indicating the risk of a UE. It is undesirable to warn the user of a UE, especially when the error would ordinarily be correctable if only one of the symbol mark or chip mark is being used on the rank of the memory module.

In embodiments of a correctable error, an ECC decoder in the memory system is able to correct all incorrect or "bad" bits within a symbol for a read of a given ECC word. In one embodiment, a symbol can be 8 bits that maps to a 2×4 array (2 data pins×4 addresses) in a DRAM memory device. In embodiments of an uncorrectable error, an ECC word is read having more bad bits than the ECC decoder has the ability to correct. In one embodiment this includes the following cases: with no marks in place, bad bits coming from more than one chip position at the same time; with a chip mark in place, additional bad bits coming from more than one symbol; with a symbol mark in place, additional bad bits coming from more than one chip; and with a chip and symbol mark in place, any additional bad bits. In addition, an embodiment of a placed or placed symbol mark will cause the ECC decoder to correct all bad bits within that symbol for all reads of the rank in which the symbol mark is placed. In one embodiment, firmware keeps track of how many CEs occur on each symbol, and places the symbol mark when one symbol has been determined to be bad enough to require a permanent fix (i.e. a threshold of CEs has been reached on that symbol). In an embodiment a placed or placed chip mark causes the ECC decoder to correct all bad bits from more than one symbol if the bad bits are all contained within a chip. In one embodiment, a chip having 8 data pins (i.e. an x8 chip) contains 4 symbols. In one embodiment, the ECC decoder will automatically place a chip mark without firmware intervention. However, in embodiments firmware has the ability to place and remove chip marks.

An embodiment provides an improved error correction method that controls communication with memory devices in two ranks to share chip marks and symbol marks between two ranks to avoid call outs to a user. By controlling communication of commands to devices in each of the ranks, a rank that determines two instances of marks are needed may share marks with another rank. The sharing of marks between ranks enables both ranks to continue error correction and detection in memory devices to prevent CEs from causing interruption of performance or a user notification. An exemplary memory module includes a plurality of ranks, where each rank includes a plurality of memory devices. Each of the memory devices may also include one or more symbols. In one embodiment, the memory module is a three dimensional (3D) memory module, where ranks correspond to layers of the module and memory devices are stacked in columns to form memory stacks within the module.

In an embodiment, a first mark condition is identified for a first memory device in a first rank, where the first mark condition indicates a first mark is need for the first memory device. The first mark may be a chip mark or symbol mark. A memory controller may then place the first mark for the first memory device. Logic may then determine a second mark condition for a second memory device in the first rank, where the second mark condition may correspond to a chip mark or symbol mark. The method includes logic that, in turn, places or enables a third mark for a third memory device in a second rank within the same memory module as the first rank. The placing is based on the two mark conditions being determined for the first rank. In an embodiment, the first mark and second marks are each chip marks in chips that are in the same position in the first and second ranks, respectively. The error handling method then configures the third memory device in the second rank to respond to commands directed to the first rank and also configures the first memory device in the first rank to respond to commands directed to the second rank. In an embodiment, a multiplexer and logic in a memory controller directs signals to control the commands to which the first and third memory devices are responsive. After configuring the commands for the first and third memory devices, the data from the first memory device is copied to the third memory device. The method then removes or disables the first mark for the first rank, due to the fact that the third memory device is now treated as part of the first rank, where the third memory device is "good" and has not been determined to have a mark condition. In contrast, the first memory device keeps a mark placed for the second rank, as the first memory device has joined the second rank, but still has the mark condition. Finally, the second mark condition for the second memory device in the first rank has the mark placed to correct the errors in the second memory device. Accordingly, both the first rank and second rank can handle subsequent CEs, such as by using an error correction code (ECC), while each of the ranks only has one mark placed. Thus, the sharing of marks provided by the embodiment between ranks avoids a notification to the user. In addition, embodiments utilizing sharing of marks between ranks enable error correction in a rank after the rank has experienced errors resulting in marks of two separate memory devices (e.g., RAM devices) in the rank.

FIG. 1 illustrates a block diagram of a system for storing and retrieving data in a memory in accordance with an embodiment. A system 100 depicted in FIG. 1 includes a computer processor 102, a memory 106 having memory cells, and a memory controller 104 for receiving data from the computer processor 102 to be stored in the memory 106. In an embodiment, the memory cells are arranged into pages, and pages are arranged into blocks. Thus, a block may contain a plurality of pages, each page containing a plurality of memory cells. In addition, the memory 106 may be organized into ranks, where each rank includes a plurality of memory devices.

In one embodiment, the memory controller 104 is coupled to the computer processor 102 and receives write requests from the computer processor 102. The write requests contain data to be written to the memory 106 and a logical address for identifying the location in the memory 106 to which the data will be written. The memory controller 104 stores data at a physical address within the memory 106. In an embodiment, the memory controller 104 maps the logic address to a physical address in the memory 106 when storing or retrieving data. The physical address for a given logical address may change each time data in the memory 106 is modified.

The system 100 is one example of a configuration that may be utilized to perform the processing described herein. Although the system 100 has been depicted with only a single memory 106, memory controller 104, and computer processor 102, it will be understood that other embodiments would also operate in other systems with two or more of the memory 106, memory controller 104, or computer processor 102. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
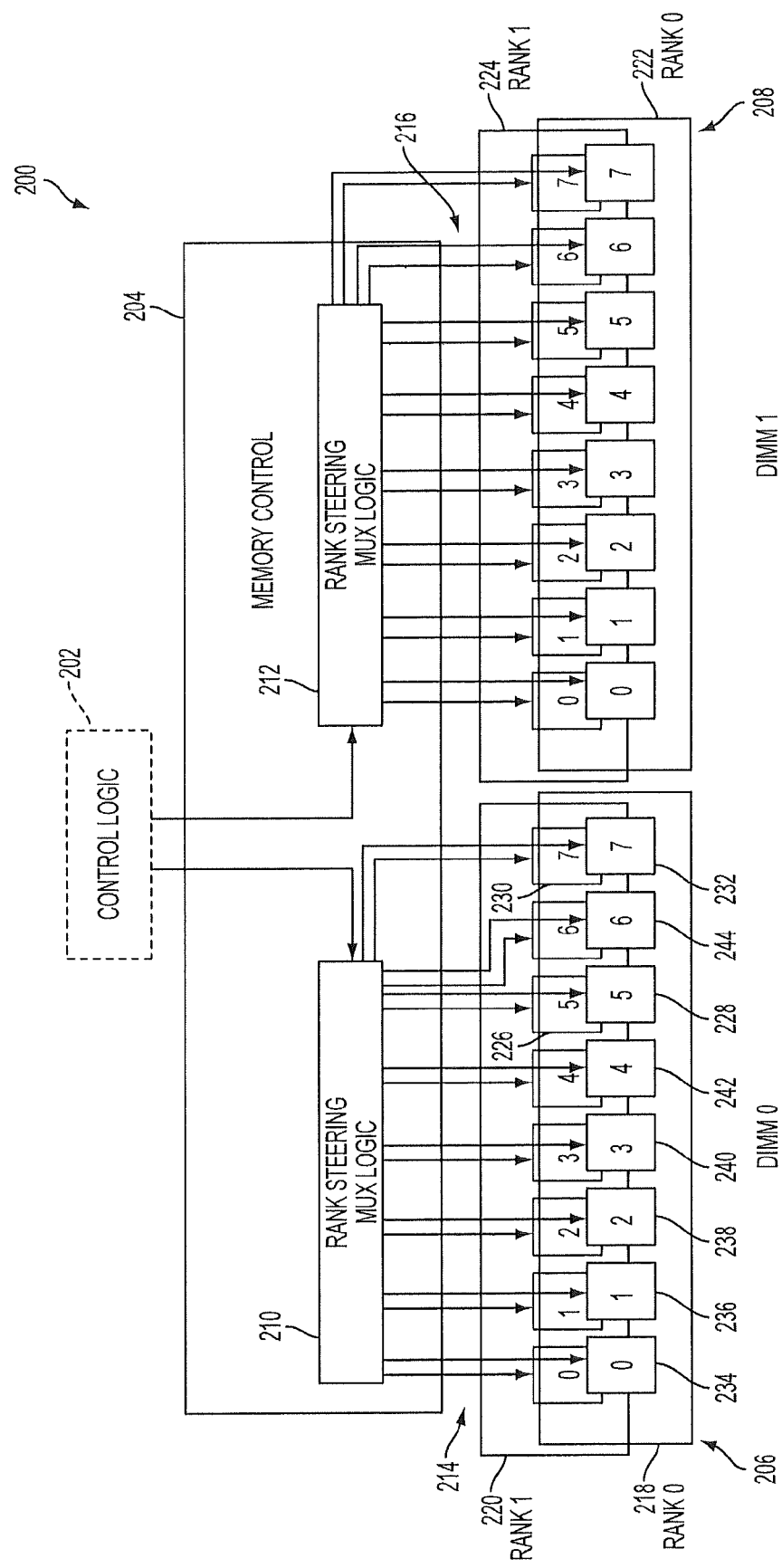
FIG. 2 illustrates a block diagram of a system that provides error detection and correction in accordance with an embodiment.

FIG. 2 is a block diagram of an embodiment of a system 200 that provides error detection and correction. The system 200 includes control logic 202, a memory controller 204, a first memory module 206 and a second memory module 208. In an embodiment, the control logic 202 is located outside the memory controller 204, such as in a service platform. A service platform may be a processor used to perform functions that are not desirable or possible to perform by main processors (e.g. Boot/initialize/diagnose errors on the main processors). In another embodiment, the control logic 204 may be located within the memory controller 204. The control logic 204 may be implemented as firmware, software, hardware or a combination thereof. The memory controller 204 includes multiplexer logic units 210 and 212 that provide the capability for receiving selected inputs and providing selected outputs, where the corresponding inputs and outputs are selected and switched based on internal logic and/or external signals provided to the units In embodiments, the memory controller 204 is a chip in communication with a plurality of memory modules, such as memory modules 206 and 208, by lines connected to pins on the modules. In an embodiment, the multiplexer logic unit 210 is connected by lines 214 to the first memory module 206. In addition, the multiplexer logic unit 212 is connected by lines 216 to the second memory module 208. In embodiments, the lines 214 and 216 are chip select outputs that are received by memory devices to indicate a rank that the multiplexer logic unit is communicating with. The depicted error correction system 200 provides flexibility by providing connections, via lines 214 and 216, to input pins that may be located on memory modules, such as DIMMs. Thus, embodiments of the error correction system may be implemented with memory modules having a chip select pin, where the modules utilize existing memory devices In one embodiment, the first memory module 206 includes a first rank 218 and a second rank 220. The first rank 218 and second rank 220 each include a plurality of memory devices. The second memory module 208 includes a first rank 222 and a second rank 224, where each rank also includes a plurality of memory devices. The multiplexer logic units 210 and 212 are configured to receive communications or commands directed to the memory modules and select or "steer" the communications to selected memory devices in the ranks within the memory modules 206 and 208. In an exemplary embodiment, the memory controller 204 determines that a first mark condition is present for the first rank 218 in a first memory device 228, where the first mark condition is based on errors detected in the first memory device 228. In addition, the memory controller 204 determines that a second mark condition is present for a second memory device 232 in the first rank 218, where the mark condition is based on errors detected in the second memory device 232. In an embodiment, the mark conditions in the first rank are conditions that indicate a need for symbol marks and/or chip marks to correct errors within the selected memory device. Accordingly, the memory controller 204 places the first mark for the first device 228 in the first rank. Although the second mark condition is determined for the second device 232, the memory controller 204 does not place the mark condition for the second device 232. In an aspect, the second mark is not placed or enabled because the error correction method shows a preference for receiving correctable errors as compared to placing the mark and risking an uncorrectable error (UE) due to an additional single cell fail. As previously described, in an embodiment where a rank (e.g., the first rank) has two marks placed on two memory devices in the rank, thus correcting errors for those two memory devices, the error correction system cannot correct future errors due to two marks being used on a single rank. In the case where two marks are placed in a single rank, the system 200 would have to notify the user of the risk of a UE with the next single cell fail, instead of simply correcting the CEs and continuing normal system operation—which occurs if the system has less than two marks are placed on a rank.

Returning to the exemplary description of the error correction system and method, the control logic 202 places a third mark for a third memory device 226 in the second rank 220 based on the mark condition determined for the second memory device 232 and the placed mark for the first memory device 228. The third mark is placed for the third memory device 226 based on the error correction mark sharing system, and is not a result of errors experienced by the third memory device 226. In one embodiment, the third memory device 226 has no errors when the third mark is placed. In an embodiment, the type of mark placed for the third memory device 226 is the same type of mark that is placed for the first memory device 228, such as a chip mark. After the third mark is placed for the third memory device 226 in the second rank 220, the multiplexer logic unit 210 configures commands directed to the first rank 218 to include commands to the third memory device 226. The multiplexer logic unit 210 also configures commands directed to the second rank 220 to include commands to the first memory device 228. Thus, the third memory device 226 responds to commands directed to the first rank 218 while the first memory device 228 responds to commands directed to the second rank 220.

Specifically, before the configuration changes for commands to memory devices 226 and 228, a communication or command directed to the first rank 218 would be communicated to each of memory devices 234, 236, 238, 240, 242, 228 and 232. After the configuration changes by multiplexer logic unit 210 (also referred to as a "mux"), a communication or command directed to the first rank will be communication to memory devices 234, 236, 238, 240, 242, 226 and 232. In other words, after the configuration changes, commands directed to the second rank 220 will also include the first memory device 228 instead of the third memory device 226. In an embodiment, the multiplexer logic unit 210 includes multiplexer hardware to switch signal paths for communications and logic that controls the communication paths.

After the configuration changes by the multiplexer logic unit 210, the memory controller 204 removes the first mark in the first rank 218, where the first mark previously corrected errors in the first memory device 228. Good data is then written to the memory device 226 by doing a scrub cleanup, where the scrub cleanup uses a maintenance engine in the memory controller. In embodiments, the scrub cleanup on the first rank 218 reads every address (which gets corrected data from the memory device 226 due to the chip mark) in the first rank 218 and writes the data back every address in the first rank 218, thus filling the third memory device 226 with good data from the data from first rank 218. In an embodiment, because the first rank 218 now includes the properly working third memory device 226 instead of the first memory device that has errors, the first mark may be disabled or removed following the scrub cleanup without subsequently experiencing associated errors. After the first mark is removed for the first rank 218, a second mark is placed on the first rank 218 to correct errors on the second memory device 232, where the second mark condition previously indicated errors in the device. Thus, following execution of the mark sharing between ranks, the first rank 218 has one mark placed for the second memory device 232 and the second rank 220 has one mark placed for the first memory device 228.

Embodiments of the memory system using the error correction method may include memory chips in a stack that form a three dimensional (3D) memory module, where each chip layer of the module corresponds to a rank. In an embodiment, a logic, system and/or method is used to control the operation of chips in the 3D memory module. In an embodiment, the stacks of chips are coupled and/or connected using suitable conductors, such as through silicon vias (TSV). In one embodiment, a TSV stack has multiple layers of chips or ranks. Addressable chip selects are associated with each of the ranks.

Figure 3:
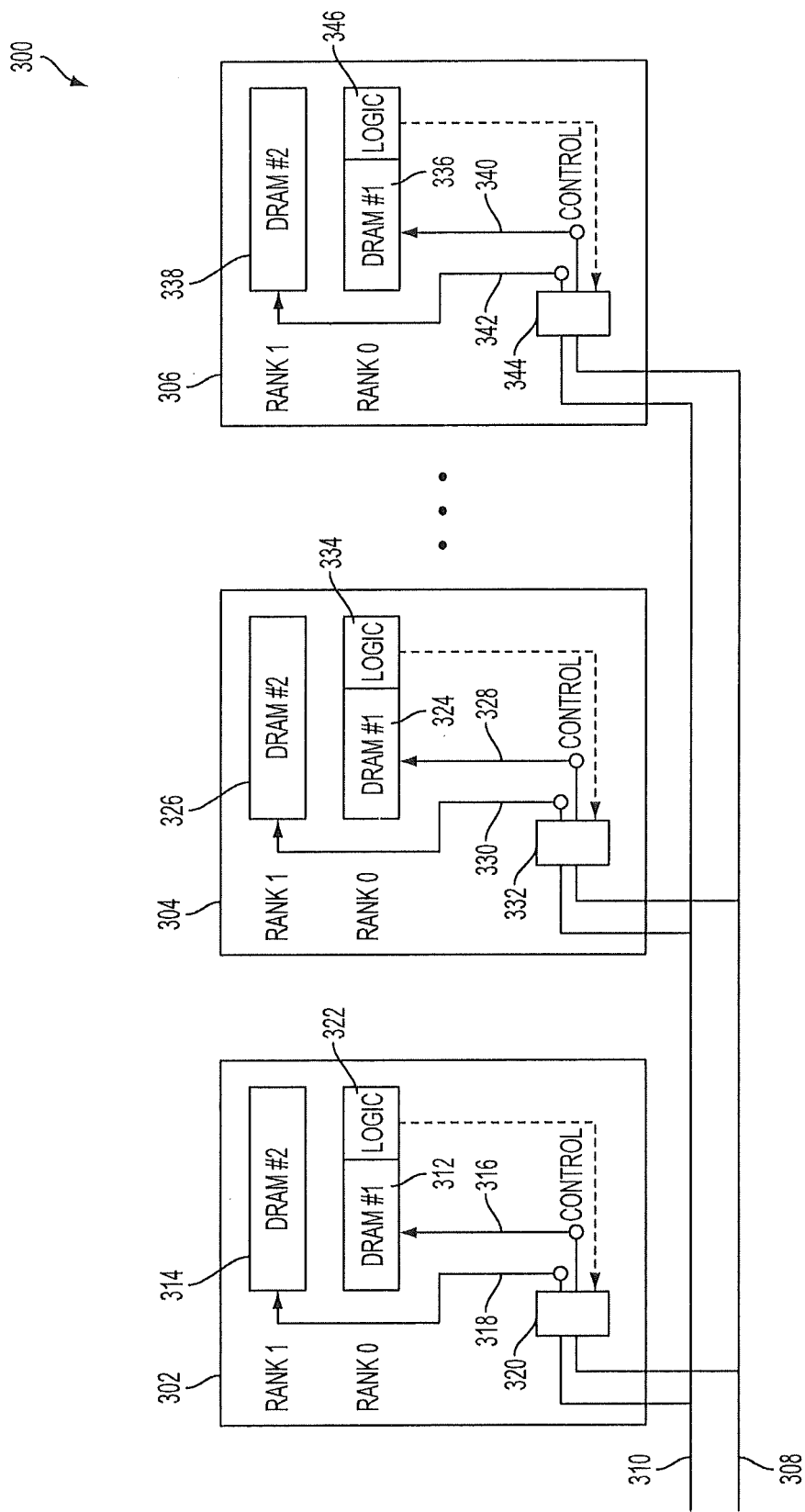
FIG. 3 illustrates a block diagram of another system that provides error detection and correction in accordance with an embodiment.

FIG. 3 is a block diagram of an embodiment of a system 300 that provides error detection and correction. The system 300 is a 3D memory module that includes a first memory stack 302, a second memory stack 304 and a third memory stack 306. In an embodiment, inputs 308 and 310 corresponding to a rank being addressed by a command from memory controller (not shown) are coupled to the memory stacks. In one embodiment, the inputs 308 are chip selects where the first input 308 corresponds to a first rank and the second input 310 corresponds to a second rank. As depicted, the first memory stack 302 includes a first memory device 312 of the first rank and a second memory device 314 of the second rank. A multiplexer logic unit 320 receives the inputs 308 and 310 and provides commands to the memory devices 312 and 314 via lines 316 and 318, respectively. A logic unit 322 provides control for operation and communication within the memory stack 302. In an embodiment, the logic unit 322 is a chip used to control memory devices 312 and 314 in ranks of the first memory stack 302.

Similarly, the second memory stack 304 includes a third memory device 324 of the first rank and a fourth memory device 326 of the second rank. A multiplexer logic unit 332 receives the inputs 308 and 310 and provides commands to the memory devices 324 and 326 via lines 328 and 330, respectively. A logic unit 334 provides control for operation and communication within the memory stack 304. In an embodiment, the logic unit 334 is a chip used to control memory devices 324 and 326 in ranks of the second memory stack 304. The third memory stack 306 includes a fifth memory device 336 of the first rank and a sixth memory device 338 of the second rank. A multiplexer logic unit 344 receives the inputs 308 and 310 and provides commands to the memory devices 336 and 338 via lines 340 and 342, respectively. A logic unit 344 provides control for operation and communication within the third memory stack 306. In an embodiment, the logic unit 344 is a chip used to control memory devices 336 and 338 in layers or ranks of the third memory stack 306.

The mark sharing between ranks as previously described may also used in the error correction system 300 to handle memory system errors. As depicted in FIG. 3, the configuring of the first memory device in the first rank, such as first memory device 312, to respond to commands directed to the second rank is performed by the multiplexer logic units, such as multiplexer logic units 320, 332 and 344, located in each of the memory stacks, as compared to the multiplexer logic units 210, 212 located in the memory controller 204 shown in FIG. 2. Accordingly, the FIG. 3 embodiment provides the mark sharing between ranks without modifying or adding logic to a standard memory controller.

Figure 4:
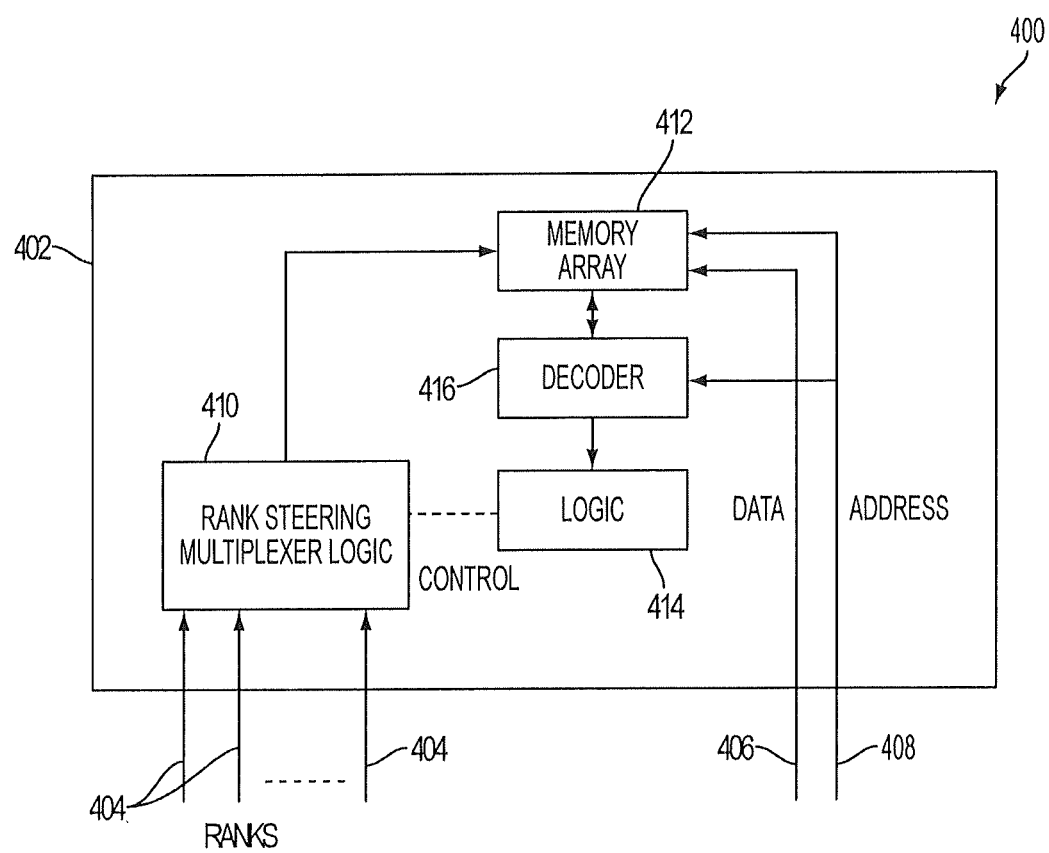
FIG. 4 illustrates a block diagram of another system that provides error detection and correction in accordance with an embodiment.

FIG. 4 is a block diagram of an embodiment of a system 400 that provides error detection and correction. The system 400 includes a plurality of memory devices arranged in ranks of a memory module, as described above with reference to FIG. 2. As depicted in FIG. 4, a memory device 402 is shown, where the memory device 402 is configured to provide the error correction method described herein. It is understood that an exemplary memory module includes a plurality of devices similar to the memory device 402, where the memory devices are logically grouped in ranks, as discussed above. For ease of explanation, the description of the memory device 402 applies to each memory device in an embodiment of a memory system implementing the mark sharing error correction method.

Accordingly, the memory device 402 may be coupled to a standard memory controller that communicates commands for memory via rank inputs 404, a data line 406 and an address line 408. The memory device 402 includes a multiplexer logic unit 410 that receives the rank inputs and is in communication with a logic unit 414. The memory device 402 also includes a memory array 412 and a decoder 416. The memory array 412 receives a rank input from the multiplexer logic unit 410. The mark sharing between ranks error correction method as described above is used in the error correction system 400 to handle memory system errors. As depicted, the configuring of the first memory device in the first rank, such as the memory device 402, to respond to commands directed to the second rank is performed by the multiplexer logic units, such as the multiplexer logic unit 410, located in each memory device of each rank. The embodiment differs from the embodiment of FIG. 2 where the multiplexer logic units 210, 212 are located in the memory controller 204. Accordingly, the multiplexer logic unit receives a rank selection via rank inputs 404 and provides a switching of the rank input dependent upon a desired configuration for the memory device 402, where the desired configuration may change based on an error correction method being used. Data and address information are provided to the memory array 412 and decoder 416 by lines 406 and 408. In an embodiment, the logic unit 414 provides overall control of traffic within the memory device 402.

In an embodiment, after determining that two mark conditions exist in a first rank that includes the memory device 402, a mark is placed for the memory device 402. The multiplexer logic unit 410 then switches the memory device 402 to respond to commands directed to a second rank, where the second rank is in the same memory module as the first rank. In addition, a multiplexer logic unit in a second memory device in the second rank places a mark for the second memory device and further configures the second memory device to respond to commands directed to the first rank. In the embodiment of FIG. 4, the configuring steps for responding to commands directed at memory ranks, as described for the embodiment of FIG. 2, are performed within the each memory device, instead of within a single memory controller. Accordingly, the FIG. 4 embodiment provides the mark sharing between ranks without modifying or adding logic to a standard memory controller.

Figure 5:
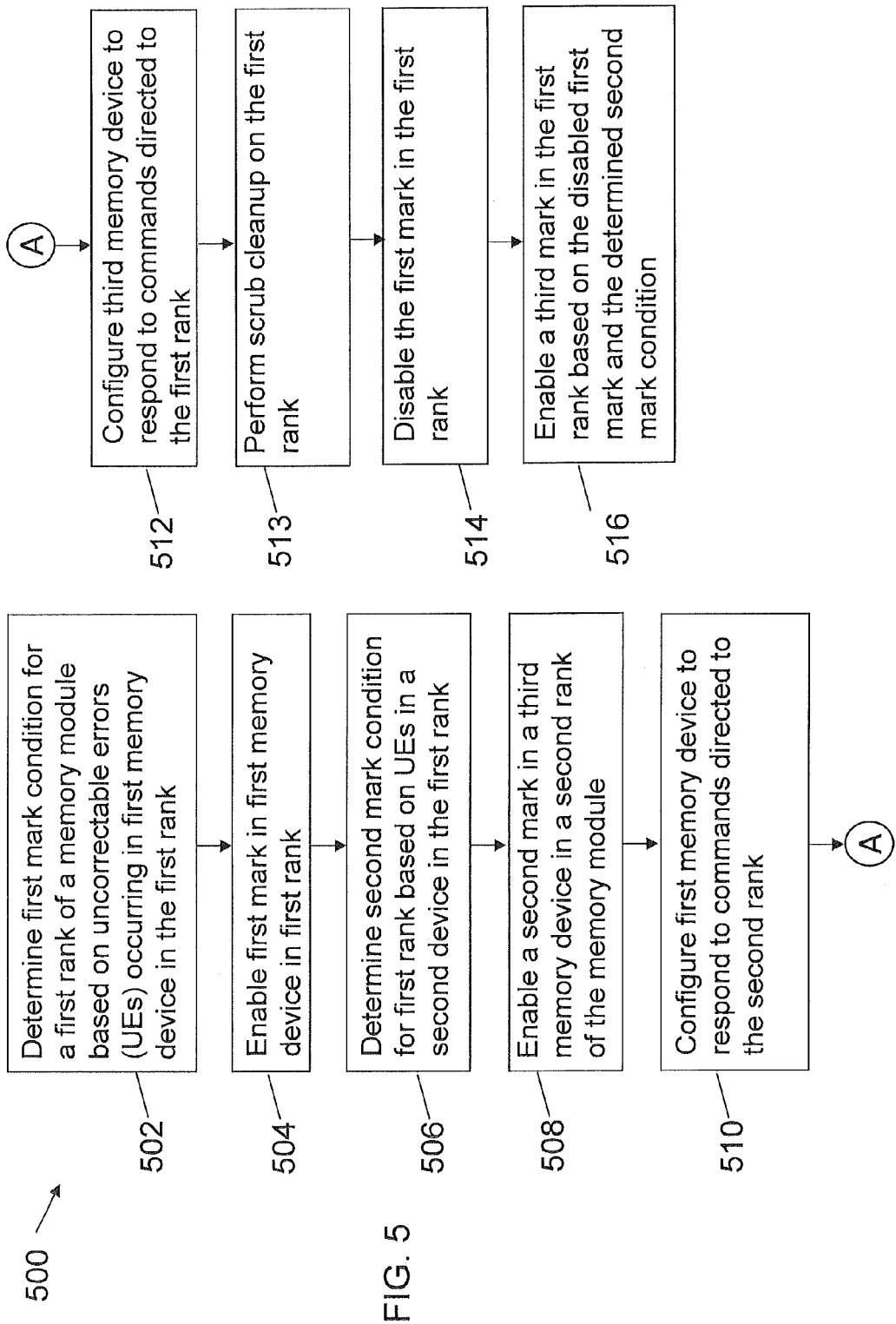
FIG. 5 is a flow chart of an error correction method and system in accordance with an embodiment.

FIG. 5 is a flow chart 500 of an error correction method and system that utilizes mark sharing between ranks to improve memory system performance and reduce user notification of errors. The blocks in flow chart 500 may be performed by any of the memory systems and devices described in FIGS. 1-4. In block 502, a first mark condition is determined for a first rank of a memory module, where the first mark condition is based on errors occurring in a first memory device in the first rank of the memory module. In block 504, a memory controller in the memory system places a first mark in the first memory device in the first rank. In block 506, a second mark condition is determined for the first rank, where the second mark condition is based on errors occurring in a second memory device in the first rank. In block 508, a second mark is placed in a third memory device in a second rank of the memory module. In block 510, the first memory device is configured to respond to commands directed to the second rank, where the configuring of the first memory device is based on placing of the first mark and the second mark. In block 512, the third memory device is configured to respond to commands directed to the first rank, where the configuring of the third memory device is based on placing of the first mark and the second mark. In block 513, a scrub cleanup is performed on the first rank, where the scrub cleanup reads every address in the first rank and writes the data back every address in the first rank and, therefore writes good data from the first rank to the third memory device. In an embodiment the data read from the first memory device in the first rank is good data due to the mark (e.g., chip mark) that corrected the data. In block 514, the memory controller removes the first mark in the first rank. In block 516, a third mark is placed in the second memory device in the first rank based on the first mark being removed and the determined second mark condition.

Technical effects and benefits include a system and method that provides an improved error correction in a memory system by sharing marks between ranks. By sharing marks between ranks, the system and method enable continued correction of correctable errors by a suitable method, such as ECC, and avoid call outs to a user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for error correction, the system comprising:
a memory module having a plurality of ranks, each rank having a plurality of memory devices, the system configured to perform a method comprising:
determining a first mark condition for a first rank of the memory module, the first mark condition based on one or more errors occurring in a first memory device in the first rank;
based on determining the first mark condition, placing, by a memory controller, a first mark in the first memory device in the first rank;
determining a second mark condition for the first rank, the second mark condition based on one or more errors occurring in a second memory device in the first rank;
based on determining the second mark condition, placing a second mark in a third memory device in a second rank of the memory module;
re-assigning the first memory device to the second rank and the third memory device to the first rank, the re-assigning based on placing the first mark and the second mark, the re-assigning including:
configuring the first memory device to respond to commands directed to the third memory device; and
configuring the third memory device to respond to commands directed to the first memory device;
reading data from the first rank and writing the data back to the first rank to verify data accuracy in the third memory device, where the data in the third memory device was previously in the first memory device;
removing, by the memory controller, the first mark in the first rank; and
placing a third mark in the second memory device in the first rank based on the first mark being removed and the determined second mark condition.

2. The system of claim 1, wherein the first memory device comprises a plurality of symbols and the second memory device comprises a plurality of symbols, wherein a symbol comprises an arrangement of bits in relation to pins in each memory device.

3. The system of claim 2, wherein determining the first mark condition comprises determining a device mark condition based on one or more errors detected in a plurality of symbols in the first memory device and wherein placing the first mark comprises placing a first device mark.

4. The system of claim 3, wherein determining the second mark condition comprises determining a symbol mark condition based on one or more errors detected in a selected symbol in the second memory device.

5. The system of claim 4, wherein placing the third mark in the second memory device comprises placing a symbol mark based on the determined symbol mark condition and the first mark being removed.

6. The system of claim 3, wherein placing the second mark in the third memory device comprises placing a second device mark.

7. The system of claim 1, wherein:
configuring the first memory device to respond to commands directed to the third memory device comprises configuring a multiplexer to cause commands directed to the second rank to be directed to the first memory device, the multiplexer being located outside the memory module; and
configuring the third memory device to respond to commands directed to the first memory device comprises configuring the multiplexer to cause commands directed to the first rank to be directed to the third memory device.

8. The system of claim 1, wherein:
configuring the first memory device to respond to commands directed to the third memory device comprises configuring a first logic to cause commands directed to the second rank to be directed to the first memory device, the memory module comprising memory stacks, each memory stack comprising memory devices stacked in a column, wherein the first logic is located in a first memory stack of the memory module; and
configuring the third memory device to respond to commands directed to the first memory device comprises configuring a second logic to cause commands directed to the first rank to be directed to the third memory device, the second logic being located in a second memory stack of the memory module.

9. A computer program product for error correction in a memory module having a plurality of ranks, each rank having a plurality of memory devices, the computer program product comprising:
a non-transitory tangible storage medium readable by a processing circuit and storing instructions for execution by the processing circuit for performing a method comprising:
determining a first mark condition for a first rank of the memory module, the first mark condition based on one or more errors occurring in a first memory device in the first rank;
based on determining the first mark condition, placing, by a memory controller, a first mark in the first memory device in the first rank;
determining a second mark condition for the first rank, the second mark condition based on one or more errors occurring in a second memory device in the first rank;
based on determining the second mark condition, placing a second mark in a third memory device in a second rank of the memory module;
re-assigning the first memory device to the second rank and the third memory device to the first rank, the re-assigning based on placing the first mark and the second mark, the re-assigning including:
configuring the first memory device to respond to commands directed to the third memory device; and
configuring the third memory device to respond to commands directed to the first memory device;
reading data from the first rank and writing the data back to the first rank to verify data accuracy in the third memory device, where the data in the third memory device was previously in the first memory device;
removing, by the memory controller, the first mark in the first rank; and
placing a third mark in the second memory device in the first rank based on the first mark being removed and the determined second mark condition.

10. The computer program product of claim 9, wherein the first memory device comprises a plurality of symbols and the second memory device comprises a plurality of symbols, wherein a symbol comprises an arrangement of bits in relation to pins in each memory device.

11. The computer program product of claim 10, wherein determining the first mark condition comprises determining a device mark condition based on one or more errors detected in a plurality of symbols in the first memory device and wherein placing the first mark comprises placing a first device mark.

12. The computer program product of claim 11, wherein determining the second mark condition comprises determining a symbol mark condition based on one or more errors detected in a selected symbol in the second memory device.

13. The computer program product of claim 12, wherein placing the third mark in the second memory device comprises placing a symbol mark based on the determined symbol mark condition and the first mark being removed.

14. The computer program product of claim 11, wherein placing the second mark in the third memory device comprises placing a second device mark.

15. The computer program product of claim 9, wherein:
configuring the first memory device to respond to commands directed to the third memory device comprises configuring a multiplexer to cause commands directed to the second rank to be directed to the first memory device, the multiplexer being located outside the memory module; and
configuring the third memory device to respond to commands directed to the first memory device comprises configuring the multiplexer to cause commands directed to the first rank to be directed to the third memory device.

16. The computer program product of claim 9, wherein:
configuring the first memory device to respond to commands directed to the third memory device comprises configuring a first logic to cause commands directed to the second rank to be directed to the first memory device, the memory module comprising memory stacks, each memory stack comprising memory devices stacked in a column, wherein the first logic is located in a first memory stack of the memory module; and
configuring the third memory device to respond to commands directed to the first rank further comprises configuring a second logic to cause commands directed to the first rank to be directed to the third memory device, the second logic being located in a second memory stack of the memory module.

17. A method for error correction in a memory module having a plurality of ranks, each rank having a plurality of memory devices, the method comprising:
determining a first mark condition for a first rank of the memory module, the first mark condition based on one or more errors occurring in a first memory device in the first rank;
based on determining the first mark condition, placing, by a memory controller, a first mark in the first memory device in the first rank;
determining a second mark condition for the first rank, the second mark condition based on one or more errors occurring in a second memory device in the first rank;
based on determining the second mark condition, placing a second mark in a third memory device in a second rank of the memory module;
reassigning the first memory device to the second rank and the third memory device to the first rank, the re-assigning based on placing the first mark and the second mark, the re-assigning including;
configuring the first memory device to respond to commands directed to the third memory device; and
configuring the third memory device to respond to commands directed to the first memory device;
reading data from the first rank and writing the data back to the first rank to verify data accuracy in the third memory device, where the data in the third memory device was previously in the first memory device;
removing, by the memory controller, the first mark in the first rank; and placing a third mark in the second memory device in the first rank based on the first mark being removed and the determined second mark condition.

18. The method of claim 17, wherein the first memory device comprises a plurality of symbols and the second memory device comprises a plurality of symbols, wherein a symbol comprises an arrangement of bits in relation to pins in each memory device.

19. The method of claim 18, wherein determining the first mark condition comprises determining a device mark condition based on one or more errors detected in a plurality of symbols in the first memory device and wherein placing the first mark comprises placing a first device mark.

20. The method of claim 19, wherein determining the second mark condition comprises determining a symbol mark condition based on one or more errors detected in a selected symbol in the second memory device, wherein placing the third mark in the second memory device comprises placing a symbol mark based on the determined symbol mark condition and the first mark being removed.

* * * * *